United States Patent
Purvis, II et al.

(10) Patent No.: US 10,883,025 B1
(45) Date of Patent: Jan. 5, 2021

(54) NON-FLAMMABLE CONTACT ADHESIVE

(71) Applicant: WILSONART LLC, Austin, TX (US)

(72) Inventors: Daniel C. Purvis, II, Purmela, TX (US); David A. Altenberg, Belton, TX (US); Kenneth Pechal, Rogers, TX (US); Eric Kendall, Temple, TX (US)

(73) Assignee: WILSONART LLC, Austin, TX (US)

( * ) Notice: Subject to any disclaimer, the term of this patent is extended or adjusted under 35 U.S.C. 154(b) by 12 days.

(21) Appl. No.: 16/242,056

(22) Filed: Jan. 8, 2019

Related U.S. Application Data

(60) Provisional application No. 62/615,670, filed on Jan. 10, 2018.

(51) Int. Cl.
| | |
|---|---|
| *C09J 153/02* | (2006.01) |
| *C09J 11/06* | (2006.01) |
| *C09J 11/08* | (2006.01) |
| *C08K 5/12* | (2006.01) |
| *C08J 3/09* | (2006.01) |
| *C08K 5/524* | (2006.01) |
| *C08K 5/101* | (2006.01) |

(52) U.S. Cl.
CPC ............. *C09J 153/02* (2013.01); *C09J 11/06* (2013.01); *C09J 11/08* (2013.01); *C08J 3/093* (2013.01); *C08J 3/095* (2013.01); *C08K 5/101* (2013.01); *C08K 5/12* (2013.01); *C08K 5/524* (2013.01); *C09J 2301/50* (2020.08)

(58) Field of Classification Search
CPC .............................. C09J 109/00; C09J 125/04
See application file for complete search history.

(56) References Cited

U.S. PATENT DOCUMENTS

| | | | | |
|---|---|---|---|---|
| 3,538,031 A | * | 11/1970 | Rice ...................... | C09J 153/02 524/271 |
| 5,593,397 A | * | 1/1997 | La Gro ................... | A61F 5/443 604/332 |

* cited by examiner

*Primary Examiner* — Kuo Liang Peng
(74) *Attorney, Agent, or Firm* — Welsh Flaxman & Gitler LLC

(57) ABSTRACT

A non-flammable contact adhesive includes copolymer rubbers, tackifiers, stabilizer resins, and a solvent composed of a mixture of flammable and non-flammable components.

18 Claims, 1 Drawing Sheet

Suppressing flammable solvent/solvents

| Evaporation rate of Nonflammable solvents | Evaporation rate of Solvent blend | Evaporation rate of Flammable solvent/solvents |
|---|---|---|
| (fast evaporating) Solstice PF, Solstice PF-C | SOLVENT BLEND NONFLAM | Trans-dichloroethylene*, Tert-butyl acetate*, PCBTF** |
| (slow evaporating) Sinera/HFX 110, Sion, Vertrel XF, Vertrel X-T85 | | Other Possible Solvents Toluene**, Lactol**, MEK* * fast evap.; ** slow evap. |

NON-FLAMMABLE CONTACT ADHESIVE

CROSS REFERENCE TO RELATED APPLICATION

This application claims the benefit of U.S. Provisional Patent Application Ser. No. 62/615,670, entitled "NON-FLAMMABLE CONTACT ADHESIVE," filed Jan. 10, 2018.

BACKGROUND OF THE INVENTION

1. Field of the Invention

The present invention generally relates to non-flammable contact adhesives.

2. Description of the Related Art

Solvent-based contact adhesives offer a variety of benefits that are well known throughout the industry. For example, solvent-based contact adhesives commonly offer high shear strength, good adhesion with a variety of materials, and short dry times. However, solvent-based contact adhesives are often flammable.

SUMMARY OF THE INVENTION

It is, therefore, an object of the present invention to provide a non-flammable contact adhesive including copolymer rubbers, tackifiers, stabilizer resins, and a solvent composed of a mixture of flammable and non-flammable components.

It is also an object of the present invention to provide a non-flammable contact adhesive wherein the non-flammable contact adhesive is a bulk adhesive.

It is another object of the present invention to provide a non-flammable contact adhesive wherein the non-flammable contact adhesive is an aerosol adhesive.

It is a further object of the present invention to provide a non-flammable contact adhesive wherein the solvent is composed of trans-dichloroethylene, a hydrofluoroolefin, and a hydrofluorocarbon.

It is also an object of the present invention to provide a non-flammable contact adhesive wherein the solvent is composed of 40 to 90 weight percent of trans-dichloroethylene, 5 to 20 weight percent of hydrofluoroolefin, and 5 to 20 weight percent of hydrofluorocarbon fluid.

It is another object of the present invention to provide a non-flammable contact adhesive wherein the solvent is composed of 40 to 90 weight percent of trans-dichloroethylene, 5 to 20 weight percent of hydrofluoroolefin, and 5 to 10 weight percent of hydrofluorocarbon fluid with zero ozone-depletion potential.

It is a further object of the present invention to provide a non-flammable contact adhesive wherein the copolymer rubbers are poly(styrene-isoprene-styrene) resins and poly(styrene-butadiene-styrene) resins.

It is also an object of the present invention to provide a non-flammable contact adhesive wherein the copolymer rubbers are composed of approximately 80% poly(styrene-isoprene-styrene) resins and 20% poly(styrene-butadiene-styrene) resins.

It is another object of the present invention to provide a non-flammable contact adhesive wherein the trans-dichloroethylene is trans-1,2-dichloroethylene.

It is a further object of the present invention to provide a non-flammable contact adhesive wherein the hydrofluoroolefin is trans-1-chloro-3,3,3-trifluoropropene.

It is also an object of the present invention to provide a non-flammable contact adhesive wherein the hydrofluorocarbon fluid is 1,1,1,2,2,3,4,5,5,5-decafluoropentane.

It is another object of the present invention to provide a non-flammable contact adhesive wherein the hydrofluoroolefin is trans-1-chloro-3,3,3-trifluoropropene.

It is a further object of the present invention to provide a non-flammable contact adhesive wherein the hydrofluorocarbon fluid is 1,1,1,2,2,3,4,5,5,5-decafluoropentane.

It is also an object of the present invention to provide a non-flammable contact adhesive wherein the solvent further includes tert-butyl acetate and parachlorobenzotrifluoride (PCBTF), trans-dichloroethylene, a hydrofluoroolefin, and a hydrofluorocarbon fluid.

It is another object of the present invention to provide a non-flammable contact adhesive wherein the hydro fluoroolefin is trans-1-chloro-3,3,3-trifluoropropene.

It is a further object of the present invention to provide a non-flammable contact adhesive wherein the hydrofluorocarbon fluid is 1,1,1,2,2,3,4,5,5,5-decafluoropentane.

It is also an object of the present invention to provide a non-flammable contact adhesive wherein the tackifiers are a rosin esters, aliphatic resins, cycloaliphatic hydrocarbon resins, water-white thermoplastic resins made from purified aromatic hydrocarbon monomers, polyterpene resins, or terpene phenolic resins.

It is another object of the present invention to provide a non-flammable contact adhesive wherein the stabilizing resins are tris(2,4-di-tert-butylphenyl) phosphite, octadecyl-3-(3,5-di-tert butyl-4-hydrophenyl)-propionate, or pentaerythritol tetrakis(3,5-di-tert-butyl-4-hydroxyhydrocinnamate).

It is a further object of the present invention to provide a non-flammable contact adhesive wherein the non-flammable contact adhesive has a percent solid level of 15% to 36% with the solvent constituting 64% to 85% by weight of the non-flammable contact adhesive.

It is also an object of the present invention to provide a non-flammable contact adhesive wherein the non-flammable contact adhesive has 70 to approximately 130 parts by weight per hundred parts by weight block copolymer rubber of tackifiers and 0.5 to 8 parts by weight per hundred parts by weight block copolymer rubber of stabilizers.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is schematic relating to the process for balancing solvents to achieve the present non-flammable contact adhesive.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

The present invention relates to a non-flammable contact adhesive. In particular, the non-flammable contact adhesive of the present invention uses a blend of solvents that both dissolve the rubbers, resins, and additives (to give the needed adhesive performance) along with the suppression of the flash point of the formulation.

The solvent blend has the solvating ability to dissolve rubber resins (both poly(styrene-isoprene) resins and poly(styrene-butadiene) resins). Also, the solvents dissolve tackifiers, heat stabilizing resins, and oxidative stabilizing additives which are used in the manufacture of the non-flammable contact adhesive in accordance with the present invention. These materials provide a rubber based contact adhesive that passes required performance requirements for bonding High Pressure Decorative Laminate (HPDL) to wood-based substrate. Also, the solvents provide evaporation behavior that allow them to be used under pressure, along with nitrogen gas, to give aerosol like (canister) spray capabilities. The non-flammable contact adhesive of present invention is sold as both a bulk adhesive (which is used with conventional brush, canister adhesive, or spray from pressurized spray pots like normal contact adhesive) and as aerosol adhesive that is non-flammable.

In accordance with a preferred embodiment, the non-flammable contact adhesive is composed of a solvent mixture consisting of trans-dichloroethylene, Solstice® PF-C or PF (a hydrofluoroolefin), and Vertrel™ XF (a proprietary hydrofluorocarbon fluid with zero ozone-depletion potential). In accordance with this embodiment, the trans-dichloroethylene is preferably trans-1,2-dichloroethylene, the Solstice® PF-C is trans-1-chloro-3,3,3-trifluoropropene, and the Vertrel™ XF is 1,1,1,2,2,3,4,5,5,5-decafluoropentane. These solvents make up the bulk of the non-flammable contact adhesive formulation.

In accordance with another embodiment, the non-flammable contact adhesive is composed of a solvent mixture consisting of tert-butyl acetate, parachlorobenzotrifluoride (PCBTF), trans-dichloroethylene, Solstice® PF-C or PF (a hydrofluoroolefin), and Vertrel™ XF (a proprietary hydrofluorocarbon fluid with zero ozone-depletion potential). In accordance with this embodiment, the tert-Butyl acetate, the Solstice® PF-C is trans-1-chloro-3,3,3-trifluoropropene, and the Vertrel™ XF is 1,1,1,2,2,3,4,5,5,5-decafluoropentane. These solvents make up the bulk of the non-flammable contact adhesive formulation.

The remainder of the non-flammable contact adhesive is principally composed of copolymer rubbers, tackifiers, and stabilizers (that is, antioxidants composed of heat stabilizing resins and oxidative stabilizing resins).

With regard to the copolymer rubbers, the copolymer rubbers used in accordance with the present invention are poly(styrene-isoprene-styrene) resins (in particular, Kraton® D1164 PT (which is a clear, linear triblock copolymer based on styrene and isoprene with a polystyrene content of 29%), Kraton® D1126 PT (which is a clear, radial copolymer based on styrene and isoprene, with a polystyrene content of 21%), Vector® 4211A ((EMV-2114) which is a poly(styrene-isoprene-styrene) resin, that is a triblock copolymer with a narrow molecular weight distribution), and Vector® 4230 ((EMV-4230) which is a radial poly(styrene-isoprene-styrene) copolymer resin, that is a radial block copolymer with a narrow molecular weight distribution)), and poly(styrene-butadiene-styrene) resins (in particular, Vector® 2518 ((EMV-2518) which is a poly(styrene-butadiene-styrene) resin, that is a triblock copolymer with a narrow molecular weight distribution)). It is also appreciated the neoprene, styrene ethylene butylene styrene (SEBS), and styrene-butadiene rubber (SBR) may be utilized as a rubber in accordance with the present invention. In accordance with a preferred embodiment, the copolymer rubbers are composed of approximately 80% Kraton® poly(styrene-isoprene-styrene) resins (wherein half is Kraton D1164PT and half is Kraton D1126 PT) and 20% Vector® poly(styrene-butadiene-styrene) resins.

With regard to the tackifiers, the tackifiers used in accordance with the present invention are Sylvatac™ RE 98 manufactured by Kraton® (which is a rosin ester, in particular a pentaerythritol ester of tall oil rosin that is a broadly compatible tackifier (listed as proprietary by supplier)), Sylvatac™ RE 4291 manufactured by Kraton® (which is a rosin ester that is a broadly compatible tackifier (listed as proprietary by supplier)) Escorez™ 1315 and 5637 manufactured by ExxonMobil® (which are tackifiers wherein Escorez™ 1315 is composed of aliphatic resin with a high softening point designed to provide high temperature performance and cohesive strength with a variety of adhesive polymers and Escorez™ 5637 is a very light color aromatic modified, cycloaliphatic hydrocarbon resin designed to tackify a variety of adhesive polymers (listed as hydrocarbon resin by supplier)), Endex™ 160 manufactured by Eastman® (which is a tackifier composed of a water-white thermoplastic resin made from purified aromatic hydrocarbon monomers and is used to modify the melt flow and increase the temperature resistance of styrenic plastic and rubber and reinforces the styrene end blocks of styrenic block copolymers (listed as hydrocarbon resin by supplier)), Piccolyte® S125 manufactured Pinova (which is a polyterpene resin that is a pale, inert, low molecular weight, thermoplastic hydrocarbon resin and functions as a tackifier), and TPR (Terpene Phenolic Resin) 160 (which is a terpene phenolic resin sold through Global Chemsource Inc. It should be noted that the Escorez™ and Endex™ resins vary in performance as they provide different levels of heat resistance and tackifying performance (often termed as heat resistance and green strength).

With regard to the stabilizing resins, they have been selected to function for the purpose of both heat stabilization and oxidative stabilization. In accordance with a preferred embodiment the stabilizing resins used in accordance with the present invention are Irgafos® 168 manufactured by BASF® (which is tris(2,4-di-tert-butylphenyl) phosphite and functions as a hydrolytically stable organo-phosphite processing stanbilizer to keep the adhesive from degradation which is usually oxygen and heat (or both) generated) and two Irganox® stabilizing resins manufactured by BASF®. The first of the two Irganox® stabilizing resins is Irganox® 1076 which is octadecyl-3-(3,5-di-tert butyl-4-hydrophenyl)-propionate and functions as a highly efficient, non-discoloring, sterically hindered primary phenolic antioxidant stabilizer that protects organic substrates against thermo-oxidative degradation (that is, it keeps the adhesive from degradation which is usually oxygen and heat (or both) generated)). The second of the two Irganox® stabilizing resins is Irganox® 1010 which is pentaerythritol tetrakis(3,5-di-tert-butyl-4-hydroxyhydrocinnamate) and functions as a highly efficient, non-discoloring, sterically hindered primary phenolic antioxidant stabilizer that protects organic substrates against thermo-oxidative degradation (that is, it keeps the adhesive from degradation when oxygen and heat (or both) are generated). It should be noted the three different stabilizers discussed above (in particular, Irgafos® 168, Irganox® 1076 and Irganox® 1010) are used to compensate for the potential stability degradation.

In addition, dye may be added to help the customer see the amount of adhesive applied to the substrate and the laminate or the adhesive may be produced with its natural (substantially clear) color.

With the foregoing in mind, the non-flammable contact adhesive of the present invention may broadly be thought of as comprising a solvent added in an amount sufficient to result in a final non-flammable contact adhesive having a percent solid level of 15% to 36% with the solvent constituting 64% to 85% by weight of the non-flammable contact adhesive; wherein the solvent is composed of 40 to 90 weight percent of trans-dichloroethylene, 5 to 20 weight percent of hydrofluoroolefin, and 5 to 10 weight percent of hydrofluorocarbon fluid with zero ozone-depletion potential.

In addition, the non-flammable contact adhesive of the present invention has 70 to approximately 130 parts by weight per hundred parts by weight block copolymer rubber (phr)) of tackifiers and 0.5 to 8 parts by weight per hundred parts by weight block copolymer rubber (phr)) of stabilizers.

In accordance with a first embodiment, the non-flammable contact adhesive is composed of:

|  | % by weight | parts by weight per hundred parts by weight block copolymer rubber (PHR) |
|---|---|---|
| Solvent |  |  |
| Trans-dichloroethylene | 61.87 | (78.82% of solvent) |
| Solstice ® PF-C | 10.02 | (12.76% of solvent) |
| Vertrel ™ XF | 6.61 | (8.42% of solvent) |
| Rubber |  |  |
| Kraton ® D1164 | 4.53 | 40.00 |
| Kraton ® D1126 | 4.53 | 40.00 |
| Vector ™ 2518 | 2.26 | 20.00 |
| Tackifier |  |  |
| TPR 160 | 1.05 | 9.28 |
| Sylvatac ™ RE 98 | 1.05 | 9.28 |
| Escorez ™ 1315 | 5.43 | 47.98 |
| Escorez ™ 5637 | 1.05 | 9.28 |
| Endex ™ 160 | 0.34 | 3.00 |
| Stabilizer/Antioxidant |  |  |
| Irgafos ® 168 | 0.34 | 3.00 |
| Irganox ® 1076 | 0.10 | 0.88 |
| Irganox ® 1010 | 0.12 | 1.06 |

While a preferred embodiment is disclosed above, it is appreciated the composition of the non-flammable contact adhesive may be varied slightly (to accommodate various desired functional characteristics, for example, tack, adhesive heat resistance, etc.) and the following represents acceptable working ranges for the above embodiment:

|  | % by weight | parts by weight per hundred parts by weight block copolymer rubber (PHR) |
|---|---|---|
| Solvent |  |  |
| Trans-dichloroethylene | 40-90 |  |
| Solstice ® PF-C | 5-20 |  |
| Vertrel ™ XF | 5-10 |  |
| Rubber |  |  |
| Kraton ® D1164 | 0.5-10 | Rubber Always Totaling 100 PHR |
| Kraton ® D1126 | 0.5-10 |  |
| Vector ™ 2518 | 0.5-10 |  |
| Tackifier |  |  |
| TPR 160 | 0.5-8 | Trackifier Totaling 70-130 PHR |
| Sylvatac ™ RE 98 | 0.5-8 |  |
| Escorez ™ 1315 | 0.5-8 |  |
| Escorez ™ 5637 | 0.5-8 |  |
| Endex ™ 160 | 0.5-8 |  |
| Stabilizer/Antioxidant |  |  |
| Irgafos ® 168 | 0.05-2 | Stabilizer/Antioxidant Totaling 0.5-8 PHR |
| Irganox ® 1076 | 0.05-2 |  |
| Irganox ® 1010 | 0.05-2 |  |

As the ranges above show, it may be possible to replace chemicals with functionally similar chemicals.

In accordance with a second embodiment, the non-flammable contact adhesive is composed of:

|  | % by weight | parts by weight per hundred parts by weight block copolymer rubber (PHR) |
|---|---|---|
| Solvent |  |  |
| Trans-dichloroethylene | 61.89 | (78.85% of solvent) |
| Solstice ® PF-C | 10.00 | (12.74% of solvent) |
| Vertrel ™ XF | 6.60 | (8.41% of solvent) |
| Rubber |  |  |
| Kraton ® D1164 | 4.66 | 40.00 |
| Kraton ® D1126 | 4.66 | 40.00 |
| Vector ™ 2518 | 2.33 | 20.00 |
| Tackifier |  |  |
| TPR 160 | 2.66 | 20.00 |
| Sylvatac ™ RE 4291 | 1.17 | 10.04 |
| Endex ™ 160 | 2.33 | 20.00 |
| Piccolyte ® S125 | 5.84 | 50.13 |
| Stabilizer/Antioxidant |  |  |
| Irgafos ® 168 | 0.32 | 2.75 |
| Irganox ® 1076 | 0.09 | 0.77 |
| Irganox ® 1010 | 0.10 | 0.86 |

While a preferred embodiment is disclosed above in accordance with the second embodiment, it is appreciated the composition of the non-flammable contact adhesive may be varied slightly (to accommodate various desired functional characteristics, for example, tack, adhesive heat resistance, etc.) and the following represents acceptable working ranges for the above embodiment:

|  | % by weight | parts by weight per hundred parts by weight block copolymer rubber (PHR) |
|---|---|---|
| Solvent |  |  |
| Trans-dichloroethylene | 40-90 |  |
| Solstice ® PF-C | 5-20 |  |
| Vertrel ™ XF | 5-20 |  |
| Rubber |  |  |
| Kraton ® D1164 | 0.5-10 | Rubber Always Totaling 100 PHR |
| Kraton ® D1126 | 0.5-10 |  |

-continued

| | % by weight | parts by weight per hundred parts by weight block copolymer rubber (PHR) |
|---|---|---|
| Vector ™ 2518 Tackifier | 0.5-10 | |
| TPR 160 | 0.5-8 | Trackifier Totaling 70-130 PHR |
| Sylvatac ™ RE 98 | 0.5-8 | |
| Endex ™ 160 | 0.5-8 | |
| S125 | 0.5-8 | |
| Stabilizer/Antioxidant | | |
| Irgafos ® 168 | 0.05-2 | Stabilizer/Antioxidant Totaling 0.5-8 PHR |
| Irganox ® 1076 | 0.05-2 | |
| Irganox ® 1010 | 0.05-2 | |

The non-flammable contact adhesive of the present invention is made using normal mixing practices for making contact adhesives. Aerosol and canister filling processes are also the same as normal filling within the aerosol and canister filling industry using nitrogen, $CO_2$ compressed air, HFA 134A (a tetrafluoroethane propellant), HFO 1234ze (a tetrafluoropropene propellant) or any other nonflammable propellant. As the ranges above show, it may be possible to replace chemicals with functionally similar chemicals.

In accordance with an alternate embodiment, especially appropriate for use with canister applications, the following formulation exhibiting a solids content of 21.5% has been found to be useful:

| | % by weight | parts by weight per hundred parts by weight block copolymer rubber (PHR) |
|---|---|---|
| Solvent | | |
| Trans-dichloroethylene | 1.52 | (1.941% of solvent) |
| Tert-butyl acetate | 50.29 | (64.062% of solvent) |
| Solstice ® PF-C | 14.86 | (18.930% of solvent) |
| PCBTF | 6.79 | (8.654% of solvent) |
| Vertrel ™ XF | 5.04 | (6.413% of solvent) |
| Rubber | | |
| Kraton ® 4211A | 4.66 | 40.00 |
| Kraton ® 4230 | 4.66 | 40.00 |
| Vector ® 2518 Tackifier | 2.33 | 20.00 |
| Sylvatac ™ RE 4291 | 1.17 | 10.00 |
| Piccolyte ® S125 | 5.84 | 50.05 |
| Endex ™ 160 | 2.33 | 19.95 |
| Stabilizer/Antioxidant | | |
| Irgafos ® 168/Alknox ® 240 | 0.32 | 2.738 |
| Irganox ® 1076/Anox ® PP18 | 0.09 | 0.776 |
| Irganox ® 1010/Anox ® 20 PW | 0.10 | 0.879 |

While a preferred embodiment is disclosed above in accordance with the second embodiment, it is appreciated the composition of the non-flammable contact adhesive may be varied slightly (to accommodate various desired functional characteristics, for example, tack, adhesive heat resistance, etc.) and the following represents acceptable working ranges for the above embodiment (wherein the solids content ranges from 15% to 36% (as shown in the range shown where the first % is for a 15% solids content range and the second % is for a 36% solids content range:

| | % by weight | parts by weight per hundred parts by weight block copolymer rubber (PHR) |
|---|---|---|
| Solvent | | |
| Trans-dichloroethylene Exempt Solvent | 1.59-1.24 | (1.941% of solvent) |
| Tert-butyl acetate | 52.53-41.00 | (64.062% of solvent) |
| Solstice ® PF-C | 15.52-12.12 | (18.930% of solvent) |
| PCBTF Non-Flammable | 7.10-5.54 | (8.654% of solvent) |
| Vertrel ™ XF | 5.25-4.10 | (6.413% of solvent) |
| Rubber | | |
| Vector ™ 4211A | 3.90-7.81 | 40.00 |
| Vector ™ 4230 | 3.90-7.81 | 40.00 |
| Vector ® 2518 Tackifier | 1.95-3.90 | 20.00 |
| Sylvatac ™ RE 4291 | 0.98-1.95 | 10.00 |
| Piccolyte ® S 125 | 4.89-9.77 | 50.05 |
| Endex ™ 160 | 1.95-3.90 | 19.95 |
| Stabilizer/Antioxidant | | |
| Irgafos ® 168/Alknox ® 240 | 0.27-0.54 | 2.738 |
| Irganox ® 1076/Anox ® PP18 | 0.08-0.15 | 0.776 |
| Irganox ® 1010/Anox ® 20 PW | 0.09-0.17 | 0.879 |

Contact Adhesive PHR Ranges
Rubber will always have a total of 100 PHR.
Resin has a range between 70-130 PHR
Antioxidant has a range between 0.5-8

With reference to FIG. 1, suppression of flammable solvents is achieved in accordance with the present invention by carefully balancing the nonflammable solvents and flammable solvents to produce a solvent blend offering evaporation rates conducive to achieving a non-flammable contact adhesive. In particular, the evaporation rates of the fast evaporating nonflammable solvents (for example, Solstice® PF-C) and the evaporation rates of the slow evaporating nonflammable solvents (for example, Vertrel™ XF) are considered in conjunction with the evaporation rates of the fast evaporating flammable solvents (for example, Trans-dichloroethylene, tert-butyl acetate) and the evaporation rates of the slow evaporating flammable solvents (for example, PCBTF) to produce a solvent blend having an evaporation rate conducive to the manufacture of the present non-flammable contact adhesive. In accordance with the present invention, each blend of solvents is tested with a close cup flash point tester at 0° C., 10° C., 20° C., 30° C., 40° C., 50° C. and 60° C. If a flash is detected at any interval the blend is considered flammable and inappropriate for utilization in accordance with the present invention. In addition to those solvents disclosed above, other solvents may be use in accordance with the present invention, for example, fast evaporating nonflammable solvents such as Solstice® PF, slow evaporating nonflammable solvents such as Vertrel™ Sinera/HFX 110 (a hydrofluorocarbon, in particular, methoxytridecafluoroheptene), Opteon™ Sion (a blend of proprietary fluids and trans-1,2-dichloroethylene (t-DCE) with azeotrope-like properties), and Vertrel™ X-T85 (a proprietary hydrofluorocarbon fluid); fast evaporating flammable solvents such as MEK (methyl ethyl ketone); and slow evaporating flammable solvents such as toluene and lactol (that is, the cyclic equivalent of a hemiacetal or a hemiketal wherein the compound is formed by the intramolecular nucleophilic addition of a hydroxyl group to the carbonyl group of an aldehyde or a ketone (for example, Calumet® 210-245).

As briefly discussed above, the present non-flammable contact adhesive may be used for both aerosol applications and for bulk applications (for example, conventional brush, canister adhesive, or spray from pressurized spray pots like normal contact adhesive). Where the non-flammable contact adhesive is used in conjunction with aerosol applications (that is, as an aerosol adhesive), the non-flammable contact adhesive will have a starting adhesive concentrate with a range of solids between 15%-26%. The propellant used could be HFC-134A (Dymel propellant) or HFO-1234ze (Honeywell Solstice propellant) up to 16% by weight of final aerosol product with nitrogen or carbon dioxide added between 1%-7% by weight. Where the non-flammable contact adhesive is used for bulk applications it may be employed as described above in the various embodiments.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A non-flammable contact adhesive, comprising:
a chemically distinct solvent comprised of a mixture of flammable and non-flammable components;
chemically distinct copolymer rubbers;
chemically distinct tackifiers; and
chemically distinct stabilizer resins.

2. The non-flammable contact adhesive according to claim 1, wherein the non-flammable contact adhesive is a bulk adhesive.

3. The non-flammable contact adhesive according to claim 1, wherein the non-flammable contact adhesive is an aerosol adhesive.

4. The non-flammable contact adhesive according to claim 1, wherein the solvent is composed of trans-dichloroethylene, a hydrofluoroolefin, and a hydrofluorocarbon.

5. The non-flammable contact adhesive according to claim 4, wherein the solvent is composed of 40 to 90 weight percent of trans-dichloroethylene, 5 to 20 weight percent of hydrofluoroolefin, and 5 to 20 weight percent of hydrofluorocarbon fluid.

6. The non-flammable contact adhesive according to claim 4, wherein the solvent is composed of 40 to 90 weight percent of trans-dichloroethylene, 5 to 20 weight percent of hydrofluoroolefin, and 5 to 10 weight percent of hydrofluorocarbon fluid with zero ozone-depletion potential.

7. The non-flammable contact adhesive according to claim 4, wherein the copolymer rubbers are poly(styrene-isoprene-styrene) resins and poly(styrene-butadiene-styrene) resins.

8. The non-flammable contact adhesive according to claim 7, wherein the copolymer rubbers are composed of approximately 80% poly(styrene-isoprene-styrene) resins and 20% poly(styrene-butadiene-styrene) resins.

9. The non-flammable contact adhesive according to claim 4, wherein the hydrofluoroolefin is trans-1-chloro-3,3,3-trifluoropropene.

10. The non-flammable contact adhesive according to claim 4, wherein the hydrofluorocarbon is 1,1,1,2,2,3,4,5,5,5-decafluoropentane.

11. The non-flammable contact adhesive according to claim 4, wherein the solvent further includes tert-butyl acetate and parachlorobenzotrifluoride (PCBTF).

12. The non-flammable contact adhesive according to claim 11, wherein the hydrofluoroolefin is trans-1-chloro-3,3,3-trifluoropropene.

13. The non-flammable contact adhesive according to claim 12, wherein the hydrofluorocarbon is 1,1,1,2,2,3,4,5,5,5-decafluoropentane.

14. The non-flammable contact adhesive according to claim 1, wherein the copolymer rubbers are a mixture of poly(styrene-isoprene-styrene) resins and poly(styrene-butadiene-styrene) resins.

15. The non-flammable contact adhesive according to claim 14, wherein the copolymer rubbers are composed of approximately 80% poly(styrene-isoprene-styrene) resins and 20% poly(styrene-butadiene-styrene) resins.

16. The non-flammable contact adhesive according to claim 1, wherein the tackifiers are selected from the group consisting of rosin esters, aliphatic resins, cycloaliphatic hydrocarbon resins, water-white thermoplastic resins made from purified aromatic hydrocarbon monomers, polyterpene resins, and terpene phenolic resins.

17. The non-flammable contact adhesive according to claim 1, wherein the stabilizing resins are at least two resins selected from the group consisting of tris(2,4-di-tert-butylphenyl) phosphite, octadecyl-3-(3,5-di-tert butyl-4-hydrophenyl)-propionate, and pentaerythritol tetrakis(3,5-di-tert-butyl-4-hydroxyhydrocinnamate).

18. The non-flammable contact adhesive according to claim 1, wherein the non-flammable contact adhesive has a percent solid level of 15% to 36% with the solvent constituting 64% to 85% by weight of the non-flammable contact adhesive.

* * * * *